United States Patent [19]

Rideout et al.

[11] Patent Number: 5,801,240

[45] Date of Patent: Sep. 1, 1998

[54] METHOD FOR EXTRACTING SEMI-REFINED CARRAGEENAN FROM SEAWEED

[75] Inventors: Christopher S. Rideout, Richmond Hill; Michael G. Bernabe, Markham, both of Canada

[73] Assignee: Tanvest Limited, Grand Cayman, Cayman Islands

[21] Appl. No.: 813,385

[22] Filed: Mar. 7, 1997

[51] Int. Cl.$^6$ .................................................. C07H 1/08
[52] U.S. Cl. .................... 536/128; 536/18.5; 536/118; 536/122; 536/123.1; 536/124
[58] Field of Search ................... 536/18.5, 118, 536/122, 123.1, 124, 128

[56] References Cited

U.S. PATENT DOCUMENTS 4,816,573  3/1989  Whitaker et al. ................. 536/128

FOREIGN PATENT DOCUMENTS 688792  12/1995  European Pat. Off. .
94/22921  9/1994  WIPO .

OTHER PUBLICATIONS

Day et al., Gums Stab. Food Ind. 5 [Proc. Ind. Conf.] 5th, pp. 571–577, 1990.

Istini et al., Bulletin of Marine Sciences and Fisheries Koichi University, vol. 14: 49–55, 1994.

Basmal et al., FAO Fish. Rep. pp. 347–351 Abstract Only 1992.

Hoffmann et al., Food Hydrocolloids, vol. 9(4): 281–289 Abstract Only, 1995.

Truus et al., Eesti Tead. Akad. Toim., Keem., vol. 45(1–2) pp. 15–29, 1996.

Primary Examiner—John Kight
Assistant Examiner—Howard C. Lee
Attorney, Agent, or Firm—Patrick J. Hofbauer

[57] ABSTRACT

An improved method of producing semi-refined *kappa* carrageenan is provided having processing steps including: (a) pre-rinsing carrageenan containing seaweed; (b) cooking the seaweed in a cooking tank containing an aqueous solution of KOH to cause desulfation at the 6-position of the galactose units of the carrageenan, to create recurring 3,6 anhydrous galactose polymers by dehydration and reorientation; (c) washing the seaweed in a neutralizing bath; (d) rinsing the seaweed in water; and, (e) drying and chopping the seaweed, the improvement being monitoring the reaction progress of the desulfation, dehydration and reorientation by continuously measuring oxidation-reduction potential of the aqueous KOH solution and, upon the occurrence of substantial reaction equilibrium of the reorientation, as indicated when the oxidation-reduction potential has reached a predetermined constant value, stopping the reaction by removal of the seaweed from the aqueous KOH solution. The process is further improved by the batch processing of the seaweed in a single processing basket thereby enabling single handling of the seaweed throughout each of the processing steps (a) through (d). The process is further improved by chopping the seaweed prior to the KOH cooking to simulate homogeneity and to accelerate the reaction process.

20 Claims, 3 Drawing Sheets

METHOD FOR EXTRACTING SEMI-REFINED CARRAGEENAN FROM SEAWEED

FIELD OF THE INVENTION

The present invention relates to an improved method for recovering semi-refined carrageenan("SRC")from seaweed.

BACKGROUND OF THE INVENTION

Types and Sources of Carrageenan

Carrageenan is the name given to a family of linear sulfated food grade polysaccharides obtained from red seaweeds (Rhodophycae, red algae species). Carrageenan constitutes the principal structure of the seaweed: it is located within the cell wall and intercellular matrix of the plant tissue. The carrageenan content within commercially harvested seaweeds can be between 30-80% of dry weight. Carrageenans have the unique ability to form an almost infinite variety of gels at room temperature, for example, rigid or compliant, tough or tender, and with high or low melting points. The gelation requires no refrigeration and the gels can be made stable through repeated freeze-thaw cycles. Uses for carrageenan include filtering media, anti-coagulant, and bulking agent. Carrageenan solutions will thicken, suspend, and stabilize particulates, as well as colloidal dispersions and water/oil emulsions. The solutions shear thin (providing ease of pumping), but quickly rebuild viscosity and suspending power on standing.

The carrageenan family has three main branches named *kappa*, *iota* and *lambda* which are well differentiated in terms of their gelling properties and protein reactivity. The different types of carrageenan are predominantly developed by different seaweeds at different points in their respective life cycles.

*Kappa* types of carrageenan are produced predominantly by *Eucheuma cottonii*, *Chondurs crispus*, *Gigartina stellata*, *Furcellaria fastigata* and *Hypnea spp*. They produce strong rigid gels.

The *lambda* types of carrageenan are produced by forms of the Gigarginacaea and Phyllophoracaea families of red algae. Although *lambda* carrageenans do not gel in water, they interact strongly with proteins, and are used to stabilize a wide range of dairy products.

The *iota* types of carrageenan are predominantly produced by *Eucheuma spinosum* and *Ahnfeltia concinna*. Carrageenan gels made with *iota* products are flaccid and compliant.

As will be discussed in greater detail below, *kappa* carrageenan has valuable properties as a food additive, with the result that methods of processing *kappa* carrageenan are widely utilized. Generally speaking, there are two types of processing methodologies for producing *kappa* carrageenan. The first is known as the "purification" or "extraction" of *kappa* carrageenan. This process involves harvesting and prolonged cooking of a selected seaweed in a hot alkali solution. The species *Eucheuma cottonii* contains predominantly *kappa* and intermediate mu carrageenans, and is thus frequently used in the production of *kappa* carrageenan. Dependant upon the desired gelling and strength characteristics of the carrageenan, an alkali metal hydroxide will usually be added to the cook solution to modify the carrageenan. The aqueous extract typically contains 1-2% carrageenan and is then filtered to remove insoluble materials and impurities. The filtered extract may then be concentrated to about 4% and purified by treatments such as filtering with activated carbon, bleaching, etc.. The purified filtrate is then treated with an alcohol (typically 2-propanol) or a salt (such as KCl) to precipitate the carrageenan. This coagulum is separated by mechanical and/or heat drying. This process requires high energy consumption and may produce environmental pollution as by-product production. The purified carrageenan product is typically colourless, tasteless, odourless, and will create a non-opaque gel in water. Purified carrageenans are generally of a quality which is suitable for pharmaceutical applications, and for use in applications where product clarity and lack of odour and taste are primary considerations.

By contrast, a semi-refined carrageenan ("SRC") product can also be recovered from seaweed, including, in particular, *Eucheuma cottonii*. The processes used to produce semi-refined carrageenan typically do not involve the filtration of a carrageenan in solution from the residual solids of the red seaweed from which the carrageenan is produced. As a result of the absence of this filtration step, the SRC product usually has residual organic material, which influences the colour, taste and smell of the carrageenan product. Thus, SRC products are usually coloured and have odourous impurities. Further, high levels of insoluble plant materials will remain in the SRC products causing them to have a cloudy appearance, which create a gel appearance that may not be desirable in pharmaceutical and certain food process applications. Accordingly, use of the SRC product is limited to a smaller range of applications in instances where impurities can be tolerated, and where production cost considerations are of singular importance. Typically, SRC gum is currently used throughout the world to extend meats, to provide gelling capabilities to various foods and pet foods, and to suspend solid active ingredients in a limited range of medicinal products for human consumption. The present invention is directed to the production of carrageenan using the semi-refined process methodologies.

Prior Art Production of Semi-Refined Carrageenan (SRC)

Conventionally, the production of SRC product is carried out locally, close to where seaweed, such as *Eucheuma cottonii*, can be harvested in large quantities, (e.g. the Philippines and Indonesia). The carrageenan-bearing seaweed is treated with a base, dependent upon the desired type and characteristics of the end product. Conventional processes for producing *kappa* SRC from *Eucheuma cottonii* seaweed are based upon five critical steps, including: (1) raw seaweed cleaning and sorting;(2) raw seaweed rinsing; (3) KOH cooking; (4) pH washing; and, (5) drying. Other process steps may additionally be incorporated to provide a finished product in a consumer-usable, semi-refined format. Such steps will typically include chopping and grinding to specific mesh sizes to enhance mixing and gel characteristics for specific end-product use.

The five steps of the conventional process for producing kappa SRC referenced above will now be described in more detail, as it is to improvements in this prior art process that the present invention is directed. More particularly, the seaweed is received and sorted to remove dark seaweed, ties used to fix the seedling seaweed to an underwater trellis, and other bits of debris collected from the beach and water during harvesting, shipping and storage. The cleaned and sorted seaweed is then rinsed with either a fresh water rinse or a recycled KOH wash, at ambient temperatures, to remove entrained salt and sand from the seaweed. Salt and sand can contribute up to 15-25% of the received weight of the seaweed. The seaweed is weighed, collected, and inserted into an aqueous KOH cooking solution maintained at approximately 60°-80° C. This process enables modification of the carrageenan and dissolves some of the alkali-soluble sugars (and modifies others to become soluble in water). Known processes require a cooking time of 2 hours for 12% KOH, or 3 hours for 8% KOH (the "%" symbol signifies by-weight concentration of KOH in aqueous solution). This KOH concentration results in a cook mixture having a pH of between 12–14, which is very corrosive and must be handled with extreme caution. The duration of the cooking process is determined with reference to time only, and not to any monitoring of the actual chemical reactions which occur during cooking. After the cooking time has elapsed, the seaweed is removed from the hot aqueous KOH solution and drained. The seaweed is then put through a series of wash steps to reduce the pH, to wash residual KOH from the seaweed, and to dissolve sugars and salts which are contained in the seaweed/KOH mixture, including salts and residual saponification products created in the KOH cook/reaction. Once the seaweed (containing carrageenan) is removed from the final fresh water rinse step, it can be chopped, dried and ground. The average moisture content of the washed semi-refined carrageenan is about 90%. Over 75% of the moisture must be removed to achieve the standard moisture content specification of 14%. In tropical regions, natural sun-drying and forced air drying are used to reduced the high moisture content. Typically, sun-drying is conducted by placing the SRC in large piles outside to enable the energy of the sun and high temperature of the ambient air to remove much of the moisture.

The quality standards of the SRC product obtained from this conventional processing methodology can vary quite widely, since the semi-refining process is frequently carried out at source. Moreover, the environmental, regional, seasonal and inherent naturally occurring variations in seaweed composition will also affect the quality of the SRC product eventually obtained. Furthermore, prior art processing times and procedures are not generally standardized, and do not maximize the efficiency and effectiveness of the semi-refining process. Inadequate cooking times will result in partial production of the carrageenan and cause a decrease in the amount and quality of SRC product ultimately recovered. Additionally, unnecessarily long cooking times will result in the consumption of excess energy during processing and will reduce overall process throughput capacity.

Accordingly, it is an object of the present invention to provide an improved method of producing carrageenan from seaweed, such as Eucheuma cottonii wherein the batch quality of the semi-refined carrageenan product so produced is stabilized and rendered more consistent.

It is a further object of the present invention to provide an improved method of producing carrageenan product from seaweed such as Eucheuma cottonii, wherein the yield of semi-refined carrageenan product is maximized for each and all variations of the seaweed feedstock.

It is yet a further object of the present invention to provide an improved method for the production of carrageenan from seaweed such as Eucheuma cottonii, wherein the energy costs associated with carrying out the process are decreased.

It is a further object of the present invention to provide an improved method for the production of carrageenan from seaweed such as Eucheuma cottonii wherein the processing times per unit volume of semi-refined carrageenan product so produced is decreased.

SUMMARY OF THE INVENTION

In accordance with the present invention, in a method of producing kappa carrageenan, by the processing steps of: (a) pre-rinsing carrageenan containing seaweed; (b) cooking the seaweed in a cooking tank containing an aqueous solution of KOH so as to cause desulfation at the 6-position of the galactose units of the carrageenan and so as to create recurring 3,6 anhydrous galactose polymers by dehydration and reorientation; (c) washing the seaweed in a neutralizing bath; (d) rinsing the seaweed in water; and (e) drying and chopping the seaweed, there is disclosed an improvement including the sub-steps of: (b1) monitoring the reaction progress of the desulfation hydration and reorientation by continuously measuring the oxidation-reduction potential of the aqueous KOH solution using an oxidation-reduction potential sensor; and, (b2) immediately upon the occurrence of reaction equilibrium of the reorientation, as indicated when the oxidation-reduction potential has reached a predetermined constant value, stopping the reaction by removal of the seaweed from the aqueous KOH solution.

Other objects, advantages, features and characteristics of the present invention, as well as methods of operation and functions of the related elements will become more apparent upon consideration of the following detailed description and the appended claims, with reference to the accompanying drawings, the latter of which are briefly described hereinbelow.

DETAILED DESCRIPTION OF A PREFERRED EMBODIMENT

The preferred embodiment of an optimized commercial scale method of the present invention for producing SRC combines traditional methods for the semi-refining of kappa carrageenan with optimizing equipment and cycle reduction techniques to provide consistent, robust, high quality, cost-effective production of SRC, substantially independently of raw material feedstock variations. Cycle time reductions are achieved by reducing the number and duration of handling points, by consolidating the material handling process through the use of transportable processing baskets for movement of feedstock through the various process steps, and by eliminating or reducing time oriented activities. Cost efficiencies are realized via throughput increases, via the recycling of process fluids, and via process controls based on relative reaction performance, as opposed to reliance on absolute values, such as processing time alone.

The essential goal of the semi-refining process is to improve the gel properties of carrageenan present in seaweed. Carrageenan contains galactose units which are sulfated in the 6-position. These can be converted into 3,6-anhydro galactose units by treatment with a base. The resulting carrageenan product containing 3,6-anhydro galactose units exhibits the desirable improved gelling and strength properties.

Figure 1A:
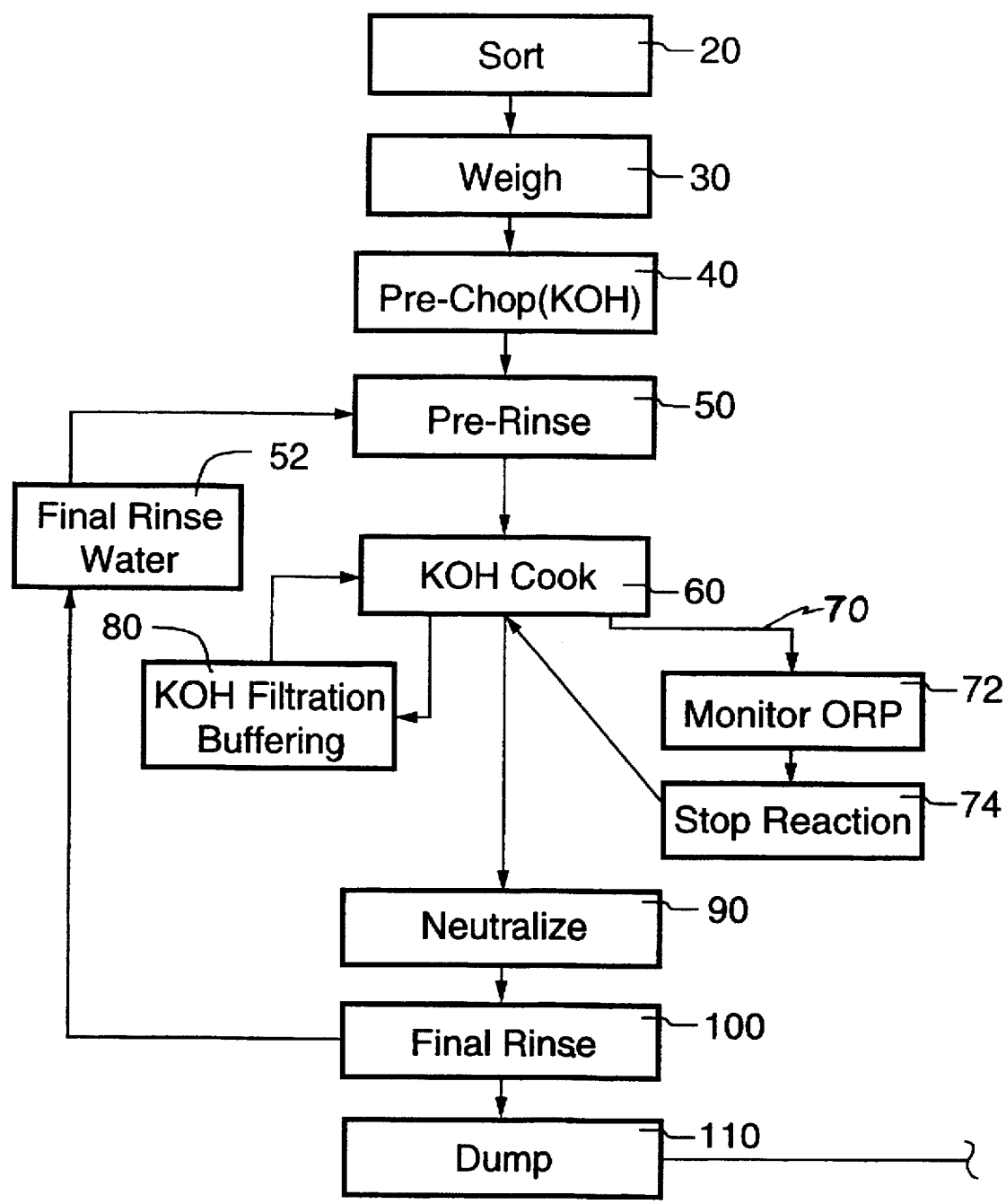
FIGS. 1A and 1B of the drawings are, collectively, a flow chart illustrating the sequential steps in a preferred embodiment process according to the present invention.
Figure 1B:
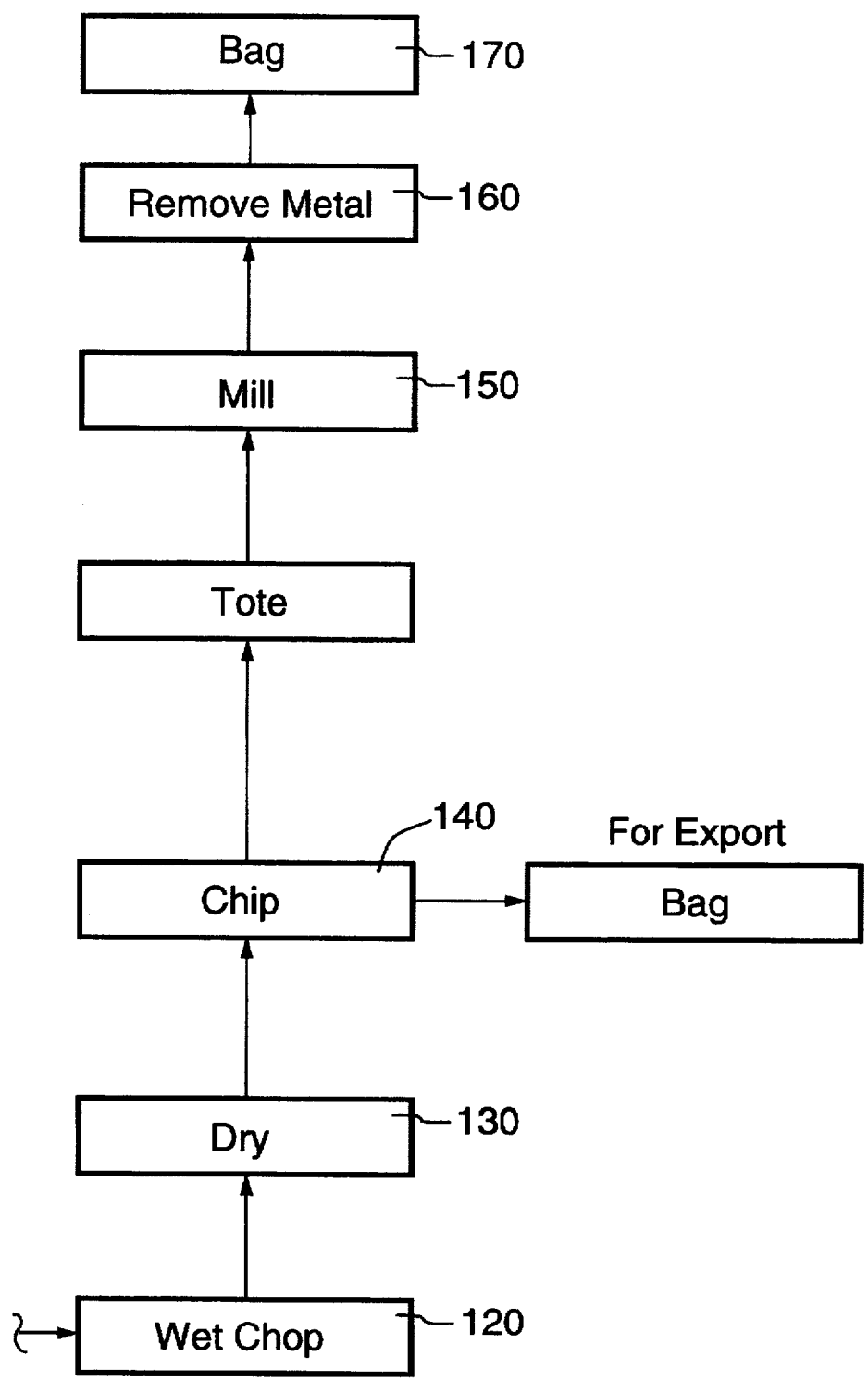

Reference will now be made to FIGS. 1A and 1B which, together provide a flow chart summarizing the improvements of the present invention, in the context of the process of semi-refining of carrageenan. A pre-cursor step of sorting 20 the seaweed may optionally occur at the location of carrageenan processing. Sorting generally refers to the removal of plant materials other than the seaweed that is desired for processing. Eucheuma cottonii is the preferred raw seaweed feedstock for the production of *kappa* carrageenan, and other types of plant material would typically be removed during sorting. If sorting occurs off-site, then bags of dried and sorted full length seaweed will be shipped to the location of carrageenan processing. Testing is preferably conducted to determine the quality of the raw supply of seaweed prior to processing. Information gained regarding the characteristics of the raw starting material will be used at later stage in the process to adjust process controls for cycle times. In the weigh step (at 30), the sorted seaweed is weighed out into pre-determined batch lots for processing. A typical target batch weight would be, for example, 1,000 kg. This is accomplished by loading the seaweed into a processing basket located on a load cell scale. The processing basket is preferably substantially cylindrical in shape and is constructed from a corrosion resistant structural material, such as stainless steel. When the target net batch weight of seaweed is obtained, the loading is stopped. It is an improvement according to the present invention to retain the carrageenan containing seaweed in the processing basket throughout the chemical processing of the carrageenan. The seaweed will remain in the single processing basket until after it has been removed from the final rinse, the process solution is drained, and the seaweed is ready for final chopping and drying.

Optionally, the seaweed may be chopped into shorter lengths prior to processing. The process for the semi-refining of carrageenan has been improved according to the present invention by the inclusion of the pre-chopping step 40. The pre-chopping step 40 increases the surface area available for reaction and improves the homogeneity of the reaction mixture and ultimately accelerates the reaction progress. Nevertheless, it has been noted by the inventors that fine chopping of the seaweed has resulted in reduced yields of SRC, likely due to dissolution of carrageenan by seaweed contained moisture which is heated above critical temperatures (approximately 90° C., dependant upon the seaweed type and characteristics) by the grinding process used to finely chop the seaweed feedstock. This hot carrageenan solution degrades, separates from the seaweed, and drains away through the basket. The pre-chopping step 40 is preferably carried out in a KOH environment, as the potential for carrageenan "leaching" will be lessened. Since *kappa* carrageenan will precipitate (gel) in the presence of $K^+$ ions, chopping in the presence of KOH will render the carrageenan insoluble in the water present in the plant materials, thus minimizing losses of carrageenan along with the inevitable water losses during processing. According to the improvements of the present invention, it is preferable to chop the seaweed into lengths of approximately 5-8 inches to reduce process cycle times by exposing an increased seaweed surface area to the alkali modification reaction. The recommended seaweed chop length of approximately 5-8 inches balances the benefits of increased surface area (theoretical optimal chop length being at ¼" to ½") with the carrying/holding limitations of the basket (ie., optimally finely ground seaweed material will not be retained in the basket). The KOH environment can be achieved by exposing the seaweed to a KOH moisture spray in an enclosed area prior to bringing the seaweed in contact with the grinding knives of a pre-chopper.

The single processing basket containing the batch weight of seaweed is lifted by overhead crane or hoist and is then seated in a seaweed pre-rinse tank for the pre-rinse step 50. The seaweed pre-rinse tank may contain either fresh water and/or an aqueous KOH pre-rinse solution which can be obtained as a product recycled (at 52 in FIG. 1A) from spent KOH solution generated from, for example, the post-cook final rinse step 100, which final rinse step 100 will be discussed in greater detail below. If spent KOH solution wash is being re-used in the pre-rinse tank, the expected concentration of such KOH pre-rinse solution would be approximately 4-8%. The water, and/or dilute KOH solution, is recirculated through the processing basket during the re-rinse step 50 to dissolve sea salt and to wash sand and other particulate matter from the seaweed. Preferably, the seaweed is agitated during this process to enable maximum contact between the pre-rinse solution and the salt residues on the seaweed, and to enable sand and other particulates to be loosened and released from the seaweed.

The processing basket is then hoisted by crane from the pre-rinse tank, drained, and then lowered into a cooking tank for the KOH cook step 60. The cooking tank preferably contains 12% by weight KOH aqueous solution maintained at approximately 75° C. The KOH solution is recirculated in counterflow fashion through the seaweed in the processing basket to provide agitation of the seaweed. The agitation is beneficial in that it ensures that the KOH contained in solution will readily reach the entire batch of seaweed. Additionally, it is preferred that the cooking vessel be equipped with an agitating means, such that the seaweed may be further mechanically agitated during the cooking process. The agitating means is preferably a propeller-type rotational device.

Two chemical transformations occur while the carrageenan containing seaweed is subjected to the cooking step 60 in the presence of KOH. The first transformation is desulfation. Desulfation occurs when a sulfate group bonded to the 6-position of the galactose units of a carrageenan polymer molecule is removed by the $K^+$ ions to form $K_2SO_4$ in solution. The moderate temperature of the KOH cook (ie., approximately 75° C.) sufficiently weakens the tertiary sulfate-galactose bonds to enable the strong $K^+$ ions from the KOH solution to remove the sulfate group from the galactose by creating potassium sulfate salt, in solution. The desulfation of the carrageenan causes a 6-position imbalance, as illustrated in the following equation.

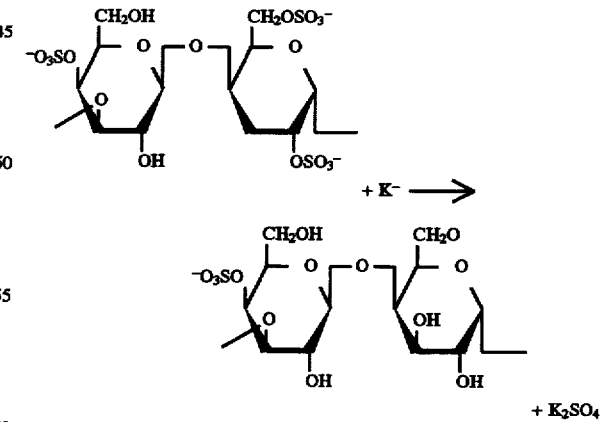

The second reaction step is a dehydration of the desulfated product to create the recurring 3,6 anhydrous galactose polymers. The $OH^-$ ions from the KOH solution, react with the tertiary and secondary bonded H groups at the 3 and 6 positions to form the anhydrous *kappa* carrageenan polymer plus water, as shown below.

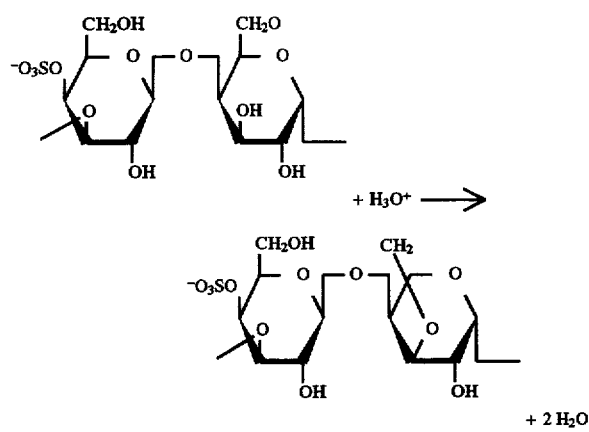

Subsequently, a reorientation of the polymer occurs to create a more stable geometry. The net result of the two reaction steps and the subsequent reorientation is sulfate removal by ring formation.

The chemical reactions are optimized below the melting point of the carrageenan/seaweed (ie., at approximately 80° C.) and above the minimum dissolution temperature of the carrageenan (which is approximately 60° C.). If cooking temperatures are maintained in this range (ie., between 60° C. and 80° C.), then both steps will readily occur. Through each of these chemical changes, a change in the monitored energy is expected, due to activation energy requirements for each of the reactions.

Figure 2:
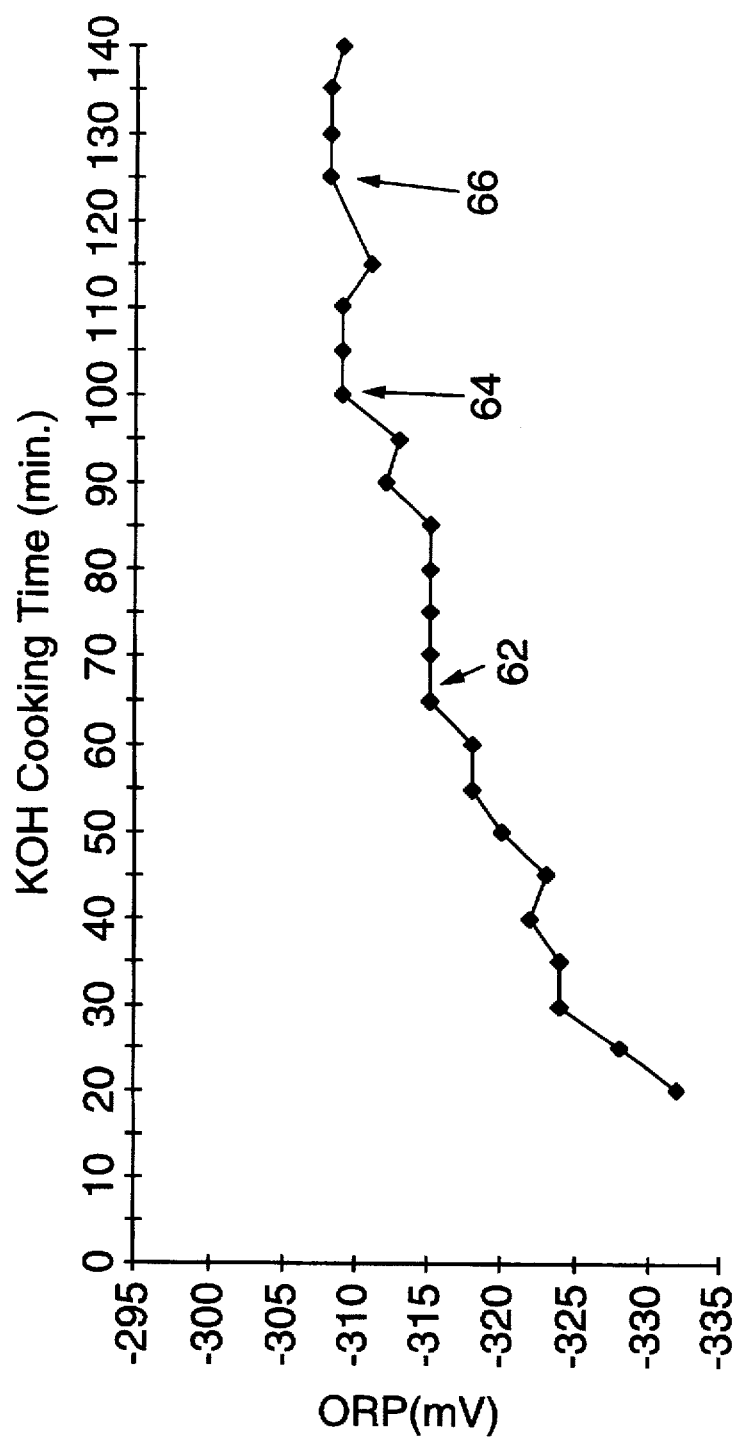
FIG. 2 of the drawings is a plot of oxidation-reduction potential against time for the KOH cooking step of Eucheuma cottonii according to the present invention.

According to one improved aspect of the present invention, the reaction progress is monitored by measuring the oxidation-reduction potential of the aqueous KOH solution during the occurrence of the desulfation, dehydration and reorientation reactions occurring in the cooking tank. A conventional oxidation-reduction potential (ORP) sensor 72 is preferably mounted for this purpose in a recirculation line 70 (see FIG. 1A) of the cooking tank. The ORP sensor measures the voltage generated or required to oxidize (add an electron) or reduce (remove an electron) from the sensor probes by the KOH bath solution being measured. Any reaction energy created or required by the reaction will be detected and measured by the ORP sensor. Measurements of the oxidation-reduction potential are preferably taken at five (5) minute intervals. The applicants' research has shown that changes in the oxidation-reduction potential can be tracked and correlated to the three major reaction steps (ie., desulfation, dehydration and reorientation) which occur during the KOH cooking process. As shown in FIG. 2, a plot of the oxidation-reduction potential against time for the KOH cooking process generates a curve which reaches three plateaus during the cooking period. The plot illustrated in FIG. 2 typifies the behavior of the reaction mixture during each of the three major reaction steps, and is by way of example, only. The precise values for voltage measured by the ORP sensor and the duration of cooking to reach a given plateau will vary somewhat dependant upon the species, quality and variations of seaweed; however, an analogous curve would be generated when the oxidation-reduction potential is plotted against time for the reaction of any given batch of seaweed. The first plateau 62 in the example of FIG. 2 occurs approximately 65 minutes after the start time (ORP reading of −315 mV), and corresponds to the desulfation of the carrageenan. A sample of the reaction mixture removed after 1 hour confirmed the presence of the desulfation product. The second plateau 64 occurs at approximately 100 minutes after start time (ORP reading of −312 mV), and represents the dehydration of the carrageenan. The third plateau 66 occurs after approximately 125 minutes after start (ORP reading of −310 mV), and the constant ORP value reached at this plateau is believed to reflect the reorientation of the polymer to a more stable geometry. It is preferable to stop the KOH cooking step as soon as possible after these three major reaction steps have been completed. Thus, upon the occurrence of the third plateau, the final 3,6 anhydrous galactose units will have stabilized, such that the gel properties of the *kappa* carrageenan are optimized. Stopping the reaction (step 74 in FIG. 1A) upon the substantial occurrence of the reaction equilibrium of the reorientation step, as signified by the final ORP plateau 66, will reduce the likelihood of over-cooking the mixture. Furthermore, the overall cooking cycle time will be decreased, resulting in an energy saving. Moreover, shortened cooking cycles will result in the ability to cook subsequent batches of seaweed more quickly, thereby decreasing the total process time and increasing the overall output of the process.

An analysis of this type can be conducted for each quality, type, maturity and region of origin of seaweed feedstock in order to determine optimal KOH cooking durations for a variety of combinations of type, maturity, and origin of seaweed. Because the starting material is harvested plant matter, significant variation in the physical and chemical structure thereof will be expected. In the prior art, the tendency was to overcook the mixture in an effort to ensure that the cooking cycle was completed, regardless of the nature of the *Eucheuma cottonii* starting material. The use of ORP monitoring in accordance with the present invention allows the cooking times to be standardized according to relative chemical reaction progressions for the three major reaction steps. This information can be correlated with information concerning the type, maturity and source of the seaweed processed. Similar information is generated and retained for repeated processing cycles with other batches of seaweed, and, ultimately, this information can be used to precisely predict the KOH cooking times for any given batch of seaweed of a known maturity, type, and source.

Once the reaction equilibrium of the reorientation step has been reached, the KOH cooking process is complete, and the processing basket is removed from the KOH cooking tank and is allowed to drain solution back into the cooking tank. Upon contact with the carrageenan, the KOH solution will take on a brown, brackish appearance. The pigments which contaminate the KOH will discolour future batches of carrageenan processed in the KOH. Colouration impacts negatively upon the perceived value of the SRC product, thus efforts are made to limit the extent of colouration due to pigment transfer from the aqueous KOH solution. To that end, the aqueous KOH solution is recirculated (at 80 in FIG. 1A) through an active carbon filter. In this way, dissolved sugars, cellulose, and seaweed pigments are removed from the KOH solution. The KOH solution can then be titrated to determine its concentration, and then buffered with KOH powder to re-establish a 12% by weight KOH solution for the processing of subsequent batches of seaweed. When the KOH solution has been sufficiently spent during the processing of repeated batches of seaweed, it will no longer be practical to filter and buffer the KOH solution for re-use in the cooking tank. The cooking tank will then be refilled with fresh 12% by weight KOH solution for further seaweed cooking cycles.

The processing basket, after draining, is moved by crane over and lowered into a neutralizing wash tank for the neutralizing step 90. The wash tank can contain fresh water, or preferably should contain a dilute solution of mineral acid of a type which will not denature the carrageenan. The use of dilute hydrochloric or muriatic acid is preferred, as it will significantly decrease the time required for the neutralization of the residual KOH and its removal from the seaweed. In fact, the effective wash cycle time can be reduced from between 1–2 hours to less than 1 hour with the use of dilute (approximately 0.1M) hydrochloric or muriatic acid. In order to increase the efficiency of the neutralization 90 process, it is further preferred to monitor the pH of the neutralizing wash tank. Such monitoring can be efficiently carried out using a conventional pH meter. As soon as the desired pH (of approximately 8–9) is reached, the neutralizing process 90 will be stopped by removing the processing basket from the neutralizing wash tank. At this point the crane will lift the processing basket out of the neutralizing wash tank, which will allow excess wash to drain back in to the tank, and then lower the processing basket into a final rinse tank containing fresh water. The final rinse step 100 will remove any significant amount of residual KOH and mineral acid residues from the carrageenan containing seaweed. The spent rinse solution from the final rinse step 100 will be somewhat alkaline, and is preferably recycled for use in the pre-rinse step 50 discussed above.

After the final fresh water rinse step 100, the processing basket is removed by crane, drained, and the seaweed is dumped (at step 110) from the processing basket onto a clean platform. It is then shoveled onto a conveyor belt and is fed into a hammermill with a 2" screen for a wet chop (at 120 in FIG. 1B). After wet-chopping, it is then necessary to remove a large quantity of water from the seaweed product by drying (at 130 in FIG. 1B). In fact, the water content is preferably reduced from approximately 90% to approximately 12%. It is preferred to utilize a physical drying means, such as a drum-roller, or a drying centrifuge to force excess water from the seaweed prior to drying. A fluidized bed dryer is the preferred drying means for final drying, since this device is capable of providing controlled drying to a specific residual moisture level.

Further processing of the SRC product will generally be to particular customer application specifications. For example, the SRC product may be further dry chipped (at 140 in FIG. 1B) and/or milled (at 150 in FIG. 1B) to a specified particle size. Additionally, the SRC product may be passed over magnets in order to remove any metal impurities (as at 160 in FIG. 1B) prior to being bagged (at 170 in FIG. 1B) or otherwise packaged for sale.

Certain variations to the improved method of the present invention may be implemented. For example, the agitating means in the KOH cooking tank could be an ebullating bed. Moreover, other methods may be employed to monitor chemical reaction progress during the various process steps. For example, the refractive index of the aqueous KOH cooking solution can be monitored by conventional means, in order to track changes in the concentration of salts in the KOH. Thus, it will be apparent that the scope of the present invention is limited only by the claims set out hereinbelow.

We claim:

1. In a method of producing *kappa* carrageenan by the processing steps of:

(a) pre-rinsing carrageenan containing seaweed;

(b) cooking the seaweed in a cooking tank containing an aqueous solution of KOH so as to cause desulfation at the 6-position of the galactose units of the carrageenan, and so as to create recurring 3,6 anhydrous galactose polymers by dehydration and reorientation;

(c) washing the seaweed in a neutralizing bath;

(d) rinsing the seaweed in water; and, (e) drying and chopping the seaweed;

the improvement wherein the cooking step of step (b) comprises the sub-steps of:

(b1) monitoring the reaction progress of said desulfation, dehydration and reorientation by continuously measuring the oxidation-reduction potential of the aqueous KOH solution using an oxidation-reduction potential sensor; and, (b2) upon the occurrence of substantial reaction equilibrium of said reorientation, as indicated by the oxidation-reduction potential reaching a predetermined constant value, stopping step (b) by removal of the seaweed from the aqueous KOH solution.

2. An improved method according to claim 1, wherein the oxidation-reduction potential sensor is placed in a recirculation line of the cooking tank.

3. An improved method according to claim 2, wherein the washing of step (c) further comprises the sub-steps of:

(c1) continuously measuring the pH of the neutralizing bath; and, (c2) stopping the washing when the pH reaches a value within a range of approximately 8.0–9.0.

4. An improved method according to claim 3, wherein the improvement further comprises the step of adding to the neutralizing bath of step (c) a dilute mineral acid which will not denature the carrageenan present in solution, thereby to more rapidly and decisively lower the pH during the wash cycle.

5. An improved method according to claim 4, wherein the dilute mineral acid is selected form the group comprising dilute hydrochloric acid and dilute muriatic acid.

6. An improved method according to claim 1, wherein the improvement further comprises carrying out cooking sub-step (b1) in a cooking tank having an agitating means.

7. An improved method according to claim 6, wherein the agitating means is a propeller-type rotational device.

8. An improved method according to claim 6, wherein the agitating means is an ebullating bed.

9. An improved method according to claim 6, wherein the agitating means is a counterflow of the KOH solution.

10. An improved method according to claim 1, wherein the improvement further comprises a sequential step (f), in which step (f) the aqueous KOH solution is reconstituted, after step(b), by filtering said aqueous KOH solution to absorb pigments, dissolved cellulose, and reaction salts contained therein.

11. An improved method according to claim 10, wherein the aqueous KOH solution is filtered using activated carbon.

12. An improved method according to claim 1, wherein the improvement further comprises using spent aqueous KOH solution recycled from the final rinsing step (d) for the pre-rinsing step (a).

13. An improved method according to claim 12, wherein the concentration of the spent KOH is approximately 4–8%.

14. An improved method according to claim 1, wherein the pre-rinsing of step (a) further comprises the sub-step of:

(a1) pre-chopping the seaweed, in the presence of KOH, into lengths of approximately 5.0 to 8.0 inches.

15. An improved method according to claim 14, wherein the seaweed is exposed to a moisture spray of said KOH in an enclosed area prior to bringing the seaweed into contact with a pre-chopper having grinding knives.

16. An improved method according to claim 1, wherein said reaction progress is monitored by continuously measuring the refractive index of the KOH solution during the desulfation, dehydration and reorientation reactions of step (b1).

17. An improved method according to claim 1, wherein the improvement further comprises:

batch processing of the seaweed in a single processing basket thereby enabling single handling of the seaweed throughout each of the processing steps (a) through (d), inclusive.

18. An improved method according to claim 1, wherein the drying process of step (e) is carried out by means of a drum-roller.

19. An improved method according to claim 1, wherein the drying process of step (e) is carried out by means of a drying centrifuge.

20. An improved method according to claim 1, wherein the drying process of step (e) is carried out by means of a fluidized bed dryer.

* * * * *